Feb. 10, 1953   T. S. SKILLMAN   2,627,967
CONVEYER SYSTEM
Filed Aug. 28, 1947

Inventor
Thomas S. Skillman.
By Ward, Crosby & Neal
Attorneys.

Patented Feb. 10, 1953

2,627,967

UNITED STATES PATENT OFFICE 2,627,967

CONVEYER SYSTEM

Thomas S. Skillman, Mosman, near Sydney, New South Wales, Australia, assignor to Punch Engineering Pty. Limited, Cammeray, near Sydney, New South Wales, Australia, a company of New South Wales, Australia Application August 28, 1947, Serial No. 771,010 In Australia September 9, 1946

4 Claims. (Cl. 198—79)

The invention relates to conveying systems and more particularly to the arrangement of conveyor belts used for the storage of articles. When articles have to be stored it has been found that storage space can be reduced considerably by using conveyor belts arranged in close proximity to each other which take articles of the same kind and move them forward for delivery.

Difficulties however arise in filling up the belts with the respective articles as driving means for the belts have to be provided which partly block the access to these belts.

It is an object of the invention to provide an arrangement which enables a free access to the storage belts so that the belts can be easily filled up with the articles without interfering with the driving means.

According to the invention this can be achieved by placing the driving means at the releasing end of each belt, so that the other ends of said belts are freely accessible for loading.

It is another feature of the invention to arrange the driving means for the storage belt in front of a common conveyor belt so that they are easily accessible.

It is a further feature of the invention to provide guiding means by which each conveyor belt is guided underneath the common conveyor belt which transports the released articles to a predetermined locality or localities.

These and other features of the invention will be apparent from the following description in connection with the drawing lodged with the provisional specification.

Figure 1:
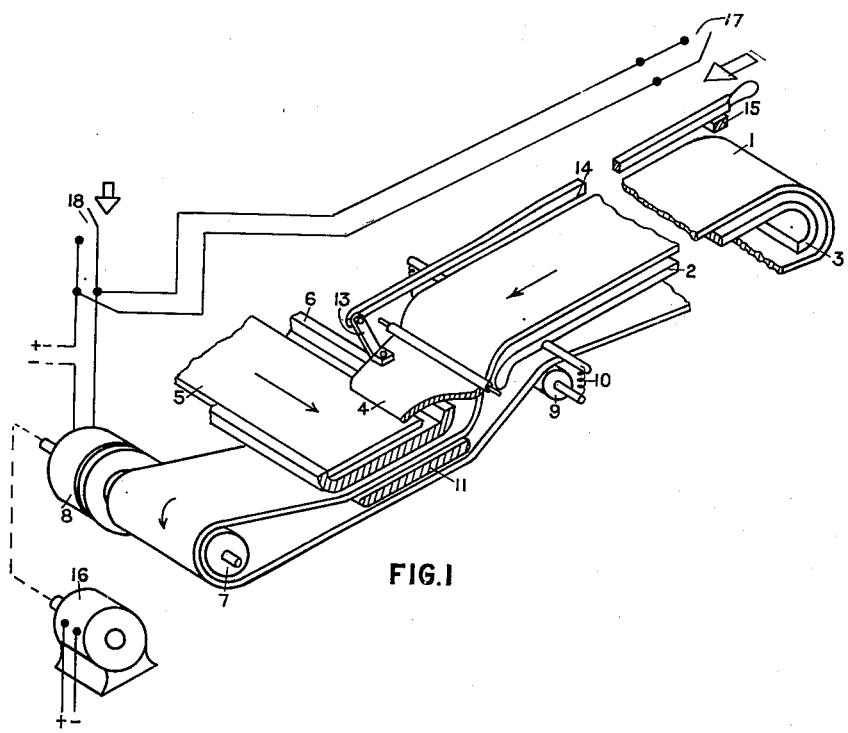
Fig. 1 shows schematically one arrangement of the invention.

Fig. 1 shows the arrangement schematically only, omitting all details of the structure necessary to support the various parts. A conveyor belt I is used as a storage belt and is filled up with articles to be delivered. This conveyor belt slides on a support 2 which has a cylindrical-shaped part 3 at one end used as a guide for the return part of the belt. When the belt I is moved forward in the direction indicated by the arrow the articles stored on this belt will topple on to a flap 4 hinged across the belt, and the articles will then slide down on to a common conveyor belt 5 which transports them to a suitable location.

The belt 5 slides in a suitable guide 6 which is preferably slightly U-shaped. The bottom part of this guide 6 is used as a guide for the conveyor belt I which is driven by the driving pulley 7. This pulley 7 is connected with a clutch 8 for example an electromagnetically operated clutch, which can be operated by closing an electrical circuit over key 18, to connect the driving means for the conveyor belt I with common driving means, schematically indicated by the motor 16, whenever articles have to be discharged from the belt. The clutch 8 can be driven by any other suitable driving means.

To separate the forward and backward travelling parts of belt I, a special guide 11 is provided underneath guide 6 of the conveyor belt 5. Provision is made to keep any slack out of the belt, and one way is shown in Fig. 1. A roller 9 is suspended by springs 10 on the support 2 and keeps the belt I always in a stretched position.

To fill the belt with the articles to be stored flap 4 can be raised by any suitable means worked from the back. As shown in Fig. 1 a bracket 13 is fixed to the flap 4 and is linked with a lever 14 guided on a support 15 and extending along the belt to the rear or loading end thereof. By pulling the lever 14 the flap 4 is raised. Clutch 8 is then energised, so that the pulley 7 is driven by motor 16 and the articles placed on the belt at the rear or loading point are moved forward until they are stopped by the raised flap 4. When the belt is full, flap 4 is lowered and the system is again ready for operation.

The clutch 8 can be actuated electrically via a suitable circuit and can be stopped automatically when the articles are released from the storage belt I on to the common conveyor belt 5. For this purpose the circuit can include a contact on flap 4, which is operated by the released articles.

Figure 2:
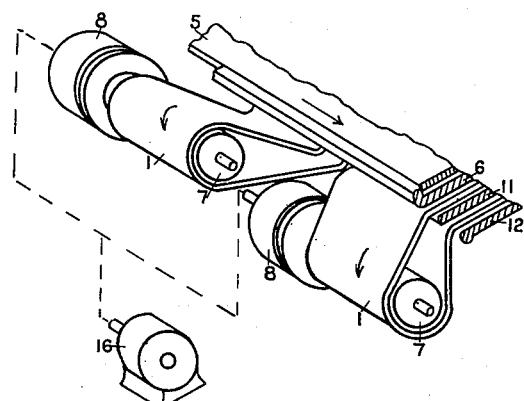
Fig. 2 shows part of another arrangement which enables a plurality of storage belts to be placed in close proximity to each other.

When a plurality of storage belts I are used in close proximity to each other, difficulties might arise owing to the fact that each clutch needs a certain space for itself. To overcome this difficulty and to get at the same time the advantage that every clutch is accessible, an arrangement as shown in Fig. 2 can be provided. In this case the driving means are arranged in a staggered fashion with respect to their vertical position. One driving clutch is arranged slightly above the conveyor belt 5 and the other clutch next to it is arranged slightly below this conveyor belt so that each clutch might overlap the driving belt next to it without interference.

The various parts as shown in Fig. 2 are marked in the same way as shown in Fig. 1. A further guide 12 however is used to guide the belts in cases where the clutches are arranged slightly below the common conveyor belt 5.

The foregoing description shows the invention by way of example only and it is within the scope of the invention to arrange the various guides and driving means in such a way as might be suitable for the requirements in any special case.

I claim:

1. Arrangement for the storage and subsequent release of articles comprising a plurality of storage belts arranged in close proximity to each other and adapted to support stored articles, each of said belts passing a loading point and a releasing point and being movable progressively for the release of said articles by driving means so arranged that said belt is freely accessible at said loading point, and means to facilitate loading each said belt with articles, said last-mentioned means comprising a stop member and actuating means to move said stop member into the path of articles to be released by said belt at its releasing point, and means to start said driving means to move articles placed on said belt at its loading point forward until the foremost article rests against said stop member, said belt moving following articles successively against said articles resting against said stop member while sliding underneath said stopped articles.

2. Arrangement for the storage and subsequent release of articles, comprising: a plurality of storage belts arranged in close proximity to each other and adapted to support stored articles, each of said belts passing a loading point and a releasing point and being movable progressively for the release of said articles; conveying means having one side passing adjacent the releasing points of a plurality of said belts and adapted to collect articles released thereat and having a free side remote from said releasing points; driving means including a driving pulley for each of said movable belts, said driving pulleys being arranged freely accessible at the free side of said conveying means opposite the releasing points of corresponding movable belts to drive said belts; guiding means arranged between said movable belts and said conveying means to guide said movable belts underneath said conveying means to said driving pulleys; and a flap hinged across each movable belt and connecting said movable belts with said conveying means to transfer articles from said movable belts to said conveying means.

3. Arrangement for the storage and subsequent release of articles, comprising: a plurality of storage belts arranged in close proximity to each other and adapted to support stored articles, each of said belts passing a loading point and a releasing point and being movable progressively for the release of said articles; conveying means passing the releasing points of a plurality of said belts arranged horizontally adjacent to each other, said conveying means having a free side remote from said releasing points; driving means including a driving pulley for each of said movable belts, said driving pulleys being mounted freely accessible at the free side of said conveying means, the driving pulleys for horizontally adjacent belts being arranged in a staggered manner so that adjacent driving pulleys are in different horizontal planes; and guiding means positioned underneath said conveying means to guide said movable belts to said staggered driving pulleys.

4. Arrangement for the storage and subsequent release of articles, comprising; a plurality of storage belts arranged in close proximity to each other and adapted to support stored articles, each of said belts passing a loading point and a releasing point and being movable progressively for the release of said articles; conveying means passing a plurality of said releasing points to collect articles released from the corresponding movable belts; driving means including a driving pulley for each of said movable belts, said driving means being so arranged that the upper part of each belt is freely accessible at its corresponding loading point; a flap hinged across each movable belt at its releasing point to transfer articles from said movable belts to said conveying means; and actuating means connected with said hinged flaps to raise said flaps for stopping the release of articles from said belts.

THOMAS S. SKILLMAN.

REFERENCES CITED

The following references are of record in the file of this patent:

UNITED STATES PATENTS

| Number | Name | Date |
|---|---|---|
| 550,744 | Challman | Dec. 3, 1895 |
| 584,502 | Gates | June 15, 1897 |
| 875,385 | Smith | Dec. 31, 1907 |
| 1,086,886 | Bernheim | Feb. 10, 1914 |
| 1,922,883 | Crago | Aug. 15, 1933 |
| 2,021,696 | Miller | Nov. 19, 1935 |
| 2,268,724 | Shackelford | Jan. 6, 1942 |